United States Patent
Knowles et al.

(10) Patent No.: US 12,157,625 B2
(45) Date of Patent: Dec. 3, 2024

(54) BEVERAGE-INGREDIENT CONTAINER

(71) Applicant: Luigi Lavazza S.p.A., Turin (IT)

(72) Inventors: David Knowles, St. Albans (GB); Stephen Hobden, Winklebury (GB); David Hay, Basingstoke (GB); Maciej Dykier, Basingstoke (GB)

(73) Assignee: Luigi Lavazza S.p.A., Turin (IT)

( * ) Notice: Subject to any disclaimer, the term of this patent is extended or adjusted under 35 U.S.C. 154(b) by 812 days.

(21) Appl. No.: 17/268,800

(22) PCT Filed: Aug. 16, 2019

(86) PCT No.: PCT/IB2019/000928
§ 371 (c)(1),
(2) Date: Feb. 16, 2021

(87) PCT Pub. No.: WO2020/035737
PCT Pub. Date: Feb. 20, 2020

(65) Prior Publication Data
US 2021/0353095 A1    Nov. 18, 2021

(30) Foreign Application Priority Data
Aug. 17, 2018   (GB) ..................................... 1813477

(51) Int. Cl.
*B65D 85/804*     (2006.01)
*A47J 31/40*      (2006.01)
*A47J 31/44*      (2006.01)

(52) U.S. Cl.
CPC ........ *B65D 85/8058* (2020.05); *A47J 31/407* (2013.01); *A47J 31/4492* (2013.01); *B65D 85/8043* (2013.01)

(58) Field of Classification Search
CPC . A47J 31/4492; A47J 31/407; B65D 85/8043; B65D 85/8058
See application file for complete search history.

(56) References Cited

U.S. PATENT DOCUMENTS

2013/0236609 A1   9/2013  Magniet
2014/0134299 A1   5/2014  Guidorzi et al.
(Continued)

FOREIGN PATENT DOCUMENTS

CN    106660677 A    5/2017
CN    107548288 A    1/2018
(Continued)

OTHER PUBLICATIONS

International Search Report for Parent Application PCT/IB2019/000928, mailed Jan. 28, 2020.
(Continued)

*Primary Examiner* — Thien S Tran
(74) *Attorney, Agent, or Firm* — The Belles Group, P.C.

(57) ABSTRACT

A beverage-ingredient container to be used in the preparation of a beverage by a beverage dispensing apparatus. The container has a first optical code on the first surface of the container, wherein the first optical code is positioned on a first surface to be read by an optical scanner of the beverage dispensing apparatus when the container is received by the apparatus in a first orientation, and a second optical code on a second surface of the container, wherein the second optical code is positioned on the second surface to be read by the optical scanner of the beverage dispensing apparatus when the container is in a second orientation. The first optical code and the second optical code each stores container-related information including a container identifier which, when read by the optical scanner of the beverage dispensing apparatus, can be used by the beverage dispensing apparatus to control beverage preparation.

20 Claims, 11 Drawing Sheets

(56) References Cited

U.S. PATENT DOCUMENTS

| | | | |
|---|---|---|---|
| 2014/0326144 A1 | 11/2014 | Novak et al. | |
| 2015/0257586 A1 | 9/2015 | DiNucci et al. | |
| 2016/0096681 A1* | 4/2016 | Wicks ................ | B65D 85/8052 |
| | | | 426/115 |
| 2016/0242594 A1* | 8/2016 | Empl .................. | A47J 31/4492 |
| 2016/0278401 A1* | 9/2016 | Noth ........................ | A23G 9/20 |
| 2016/0376140 A1 | 12/2016 | Tansey, Jr. | |
| 2017/0253473 A1 | 9/2017 | Melville, Jr. et al. | |
| 2017/0341856 A1 | 11/2017 | Aschwanden | |
| 2018/0253579 A1* | 9/2018 | Wu .................... | G06K 7/10841 |

FOREIGN PATENT DOCUMENTS

| | | | | |
|---|---|---|---|---|
| CN | 108701244 A | | 10/2018 | |
| CN | 108701245 A | | 10/2018 | |
| EP | 2148598 B1 | * | 8/2017 | .............. A47J 31/00 |
| GB | 2569625 A | * | 6/2019 | ......... B65D 85/8046 |
| JP | 2012-035119 A | | 2/2012 | |
| JP | 2015-006604 A | | 1/2015 | |
| JP | 3203550 U | | 4/2016 | |
| JP | 2017-533757 A | | 11/2017 | |
| WO | WO 2012/008825 A1 | | 1/2012 | |
| WO | WO 2016/063087 A1 | | 4/2016 | |
| WO | WO 2016/071155 A1 | | 5/2016 | |
| WO | WO 2016/120834 A2 | | 8/2016 | |

OTHER PUBLICATIONS

United Kingdom Search Report for Priority Application No. 1813477.5, dated Feb. 14, 2019.

* cited by examiner

BEVERAGE-INGREDIENT CONTAINER

CROSS-REFERENCE TO RELATED APPLICATIONS

The present application claims priority to United Kingdom Patent Application No. 1813477.5, filed on Aug. 17, 2018, the entirety of which is incorporated herein by reference.

FIELD

The technology described herein relates to a beverage-ingredient container, a beverage dispensing apparatus and a method of operating such an apparatus.

BACKGROUND

Beverage-ingredient containers are known to be used in beverage dispensing apparatus for the preparation of beverages, such as coffee or tea. A beverage-ingredient container is typically shaped to contain a beverage making ingredient and to be inserted in a holder of the beverage dispensing apparatus. The beverage dispensing apparatus then injects water into the container to dissolve or infuse the beverage ingredient with the water to form the beverage. The beverage flows out of the container through a suitable outlet, which may simply be an opening or perforation in the container. The container may incorporate a filter to prevent passage of solid components such as ground coffee out of the container.

Beverage dispensing apparatus are often configured to accept a variety of different containers (container types) corresponding to a wide range of beverage types, and the user will select the container to be used for the preparation of their desired beverage by inserting the desired container into the holder. The different beverage types will often need to be prepared differently, and the beverage dispensing apparatus is able to do this using different sets of beverage making parameters, such as a volume of water through the container, water flow rate, dwell time of water in the container and water temperature, amongst others.

In a typical beverage dispensing apparatus, there is provided a user interface through which a user must inform the beverage dispensing apparatus of the container (or drink type) that has been or is to be inserted into the holder. The user will then have to select one or more beverage making parameters for use in the preparation of the beverage.

It is desired to provide an improved beverage-ingredient container and beverage dispensing apparatus.

SUMMARY

According to an aspect of the technology described herein, there is provided a beverage-ingredient container to be used in the preparation of a beverage by a beverage dispensing apparatus; wherein the container is receivable in a holder of the beverage dispensing apparatus in either a first orientation in which a first surface of the container faces an optical scanner of the beverage dispensing apparatus or a second orientation in which a second surface of the container faces the optical scanner; the container comprising: a first optical code on the first surface of the container, wherein the first optical code is positioned on the first surface to be read by the optical scanner of the beverage dispensing apparatus when the container is in the first orientation; and a second optical code on the second surface of the container, wherein the second optical code is positioned on the second surface to be read by the optical scanner of the beverage dispensing apparatus when the container is in the second orientation; wherein the first optical code and the second optical code each stores container-related information including a container identifier which, when read by the optical scanner of the beverage dispensing apparatus, can be used by the beverage dispensing apparatus to control beverage preparation.

In this way, the container type can be identified automatically by the beverage dispensing apparatus, and the apparatus can automatically influence the way that the beverage is prepared in dependence on the specific beverage type to which the identified container relates. For example, having identified the container type, a user interface of the beverage dispensing apparatus can be used to guide the consumer in how to deliver the beverage type to their requirements.

By providing optical codes on two surfaces of the container in such a way that the container identifier will be readable for two different orientations of the container, it is ensured that the apparatus can operate as above regardless of which way the container is oriented in the holder of the apparatus, thereby increasing ease of use for the user. That is, the technology described herein allows a user to insert the container into a holder of the beverage dispensing apparatus in a plurality of orientations, whilst ensuring that the beverage dispensing apparatus can still control beverage preparation in the manner described above.

Additionally, the technology described herein removes the need for a user to inform the beverage dispensing apparatus of the container type that has been or is to be inserted into the holder, thereby providing a simplified user interface.

Furthermore, the container identifier allows the beverage dispensing apparatus to monitor or track the order in which containers are used to prepare a multi-container beverage. For example, the beverage dispensing apparatus may indicate to the user that the incorrect container has been used, upon detecting that the container (that should be used later on in the multi-container beverage preparation process) has been inserted into the beverage dispensing apparatus prematurely.

The beverage ingredient container may comprise a front sheet and a back sheet. The front sheet and the back sheet may be formed (at least in part) from a liquid- and air-impermeable sheet material. The front sheet and the back sheet may be permanently bonded together around their top and side edges to form a sachet or pouch. The front sheet and the back sheet may also be releasably bonded together along a bottom edge of the container. The bond along the bottom edge of the container may be releasable under the effect of heat or pressure inside the container. The bond along the bottom edge of the container may be by means of a pressure-sensitive adhesive. The container may comprise a folded web of filter material (e.g. suitable for supporting a beverage ingredient thereon) bonded to the inside walls of the front sheet and the back sheet. The container may comprise a nozzle having a tubular bore. The nozzle may be inserted into the top edge of the sachet and bonded in airtight fashion to the front sheet and the back sheet.

The optical scanner may be configured to capture an image of the optical code being scanned. The optical scanner may be configured to process the captured image to extract information encoded within the optical code. This may be done by converting the captured image into a plurality of digital values and decoding the plurality of digital values to extract the information (e.g. a container identifier) encoded within the optical code.

At least one of the first optical code and the second optical code may store supplemental container-related information in addition to the container identifier.

The supplemental container-related information may include one or more of: an identifier of a drink-type associated with the container identifier; an indication of a weight of beverage ingredient stored within the container, an indication of a geometry of the container; and an identifier of an injection nozzle with which the container is compatible.

The first optical code may store more container-related information than the second optical code.

The surface area occupied by the first optical code on the first surface may be larger than the surface area occupied by the second optical code on the second surface.

The first surface may be a back surface of the container and the second surface may be a front surface of the container. In this way, a larger surface area on the front side of the container may be used for marketing material and branding.

The first optical code may be in the form of a first barcode. The second optical code may be in the form of a second barcode which is different to the first barcode.

The container-related information may be encoded in the first barcode according to the UPC-A barcode standard. The container-related information may be encoded in the second barcode according to the Code-2of5 barcode standard.

According to a further aspect of the technology described herein, there is provided an apparatus for preparing a beverage from a container as claimed in any preceding claim, the apparatus comprising: a holder for receiving the container therein; an optical scanner configured to read the container-related information stored in the first optical code if the container is received by the holder in the first orientation and to read the container-related information stored in the second optical code if the container is received by the holder in the second orientation; and a controller configured to control beverage preparation based on the container identifier included in the container-related information that has been read by the optical scanner.

The controller may be configured to control beverage preparation by determining a set of one or more beverage making parameters for preparing the beverage, based at least in part on the container identifier.

To facilitate this, the (e.g. controller of the) beverage dispensing apparatus may include or be in communication with a database containing a plurality of different sets of beverage making parameters for respective container types (container identifiers). In that case, determining a set of one or more beverage making parameters for preparing the beverage, based at least in part on the container identifier, may comprise obtaining the set of beverage making parameters from an entry in the database that corresponds to the container identifier.

The set of one or more beverage making parameters may be used to prepare the beverage from the container (i.e. without any further input from the user). Alternatively, the set of one or more beverage making parameters may be used to guide the user in how to prepare the beverage type to their requirements. For example, the set of one or more beverage making parameters may comprise alternative beverage making parameters that are suitable for preparing the beverage type, and the user may make a selection between the one or more beverage making parameters to be used with the container to prepare the beverage.

Alternatively, the controller may be configured to control beverage preparation by determining a set of one or more beverage making parameters for preparing the beverage, based on the container identifier and supplemental container-related information.

In this arrangement, the extent by which the set of one or more beverage making parameters is determined based on the container-related information stored in the optical code being read by the optical scanner may depend on how complete the supplemental container-related information stored in the optical code is.

In some arrangements, all of the supplemental container-related information necessary to determine the set of one or more beverage making parameters may be provided by the optical code, in which case the controller may use that information to determine the set of one or more beverage making parameters. However, in other arrangement some but not all container-related information, e.g. the container identifier only, may be provided in the optical code that is read (e.g. the second optical code) and the beverage dispensing apparatus may obtain the supplemental information from other sources such as a stored or online database.

The controller may be configured to obtain the supplemental container-related information by determining whether the container-related information that has been read by the optical scanner includes supplemental container-related information; and if it is determined that the container-related information that has been read by the optical scanner does not include supplemental container-related information: obtaining the supplemental container-related information from a different source, based on the container identifier; whereas if it is determined that the container-related information that has been read by the optical scanner does include supplemental container-related information: obtaining the supplemental container-related information from the container-related information that has been read by the optical scanner.

Obtaining the supplemental container-related information from a different source based on the container identifier may comprise obtaining the supplemental container-related information from an entry in a database corresponding to the container identifier.

The beverage dispensing apparatus may be configured to prepare the beverage from the container using the set of one or more beverage making parameters.

The beverage dispensing apparatus may further comprise a user-interface comprising an electronic display. The user interface may be configured to receive an input by a user of the apparatus. The set of one or more beverage making parameters may comprise alternative beverage making parameters defined for the container. The controller may be configured to display the alternative beverage making parameters defined for the container to the user on the electronic display; and if the user-interface receives an input corresponding to a selection of one of the alternative beverage making parameters displayed on the electronic display: prepare the beverage from the container using the selected beverage making parameter.

According to a further aspect of the technology described herein, there is provided a method of operating a beverage dispensing apparatus which is suitable for preparing a beverage from a beverage-ingredient container which comprises a first optical code positioned on a first surface of the container and a second optical code positioned on a second surface of the container, wherein the first optical code and the second optical code each stores container-related information including a container identifier; the method comprising: receiving the container in a holder of the beverage dispensing apparatus in either a first orientation in which the first optical code faces an optical scanner of the beverage dispensing apparatus or a second orientation in which the second optical code faces the optical scanner; reading, by the optical scanner, the container-related information stored in either the first optical code or the second optical code, depending on whether the container is received by the holder in the first orientation or the second orientation, respectively; and controlling, by a controller of the beverage dispensing apparatus, beverage preparation based on the container identifier included in the container-related information that has been read by the optical scanner.

Controlling beverage preparation based on the container identifier may comprise determining a set of one or more beverage making parameters for preparing the beverage based, at least in part, on the container identifier.

Controlling beverage preparation based on the container identifier may comprise determining a set of one or more beverage making parameters for preparing the beverage based on the container identifier and supplemental container-related information.

The method may further comprise obtaining the supplemental container-related information by determining whether the container-related information that has been read by the optical scanner includes supplemental container-related information. The method may comprise, if it is determined that the container-related information that has been read by the optical scanner does not include supplemental container-related information: obtaining the supplemental container-related information from a different source, based on the container identifier. The method may comprise, if it is determined that the container-related information that has been read by the optical scanner does include supplemental container-related information: obtaining the supplemental container-related information from the container-related information that has been read by the optical scanner.

Obtaining the supplemental container-related information from a different source based on the container identifier may comprise obtaining the supplemental container-related information from an entry in a database that corresponds to the container identifier.

The method may further comprise the beverage dispensing apparatus preparing the beverage from the container using the set of one or more beverage making parameters.

The set of one or more beverage making parameters may comprise alternative beverage making parameters defined for the container. The method may further comprise displaying the alternative beverage making parameters defined for the container to a user of the beverage dispensing apparatus on an electronic display; receiving a user-input corresponding to a selection of one of the alternative beverage making parameters displayed on the electronic display; and preparing the beverage from the container using the selected beverage making parameter.

The various elements described herein in relation to the apparatus for preparing a beverage from the container, such as the electronic display or display screen, online database and controller, may be coupled to one another via a wireless link and may consequently comprise transceiver circuitry and one or more antennas. Additionally or alternatively, the elements described herein may be coupled to one another via a wired link and may consequently comprise interface circuitry. It should be appreciated that the elements described herein may be coupled to one another via any combination of wired and/or wireless links.

The apparatus (and various associated elements) described herein may comprise any suitable circuitry to cause performance of the methods described herein and as illustrated in the Figures. The apparatus may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

The apparatus may comprise and/or be in communication with one or more memories that store the data described herein, and/or that store software for performing the processes described herein. The memory may be any suitable non-transitory computer readable storage medium, data storage device or devices, and may comprise a hard disk and/or solid state memory (such as flash memory). The memory may be permanent non-removable memory, or may be removable memory (such as a universal serial bus (USB) flash drive).

The memory may store a computer program comprising computer readable instructions that, when read by a controller or processor, causes performance of the methods described herein, and as illustrated in the Figures. The computer program may be software or firmware, or may be a combination of software and firmware.

Any aspect may comprise any combination of the features and/or limitations referred to with respect to any of the statements above, except combinations of such features that are mutually exclusive.

BRIEF DESCRIPTION OF THE DRAWINGS

Arrangements of the technology described herein will now be described, by way of example, with reference of the accompanying drawings, in which.

DETAILED DESCRIPTION OF THE DRAWINGS

Figure 1:
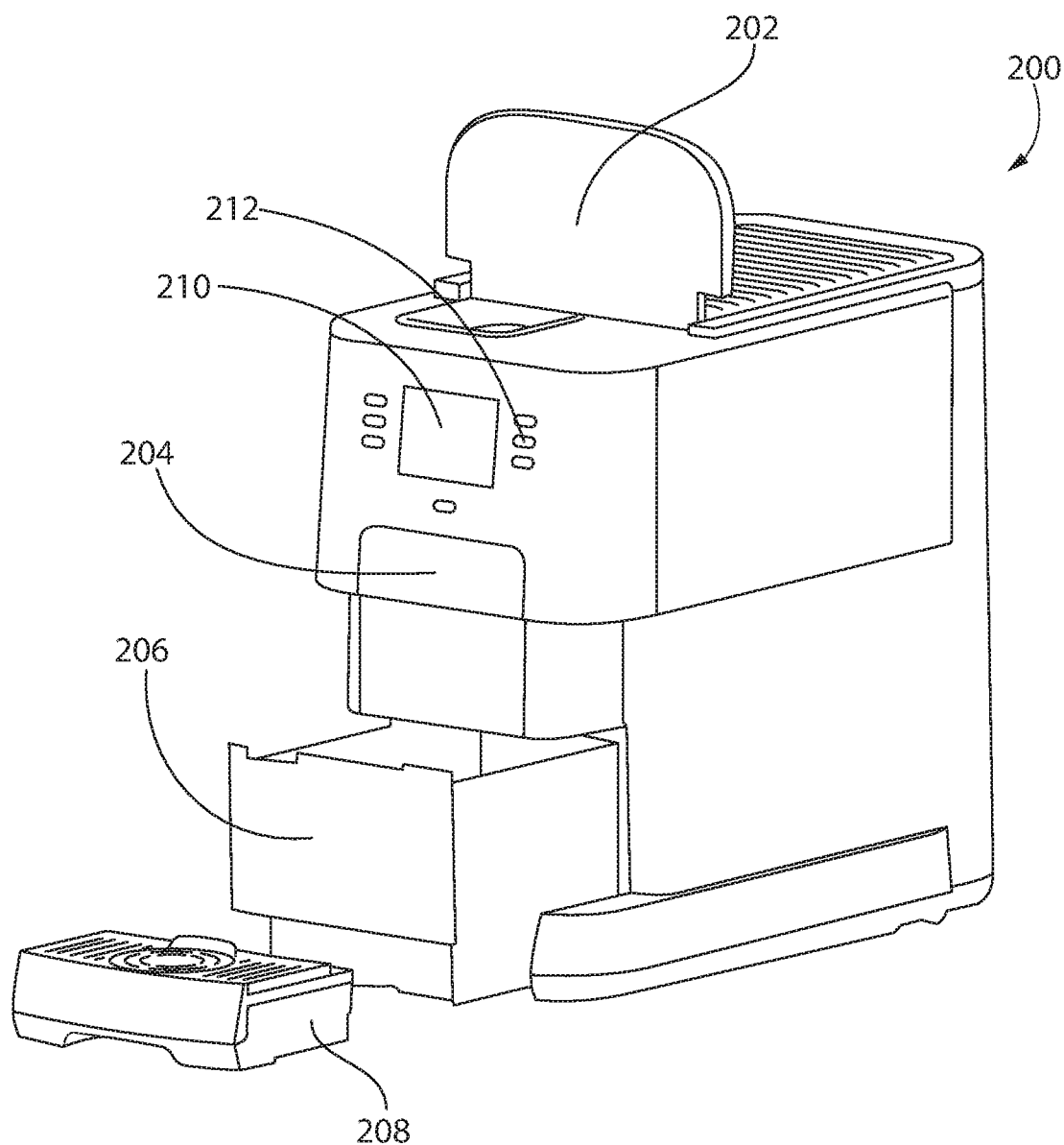
FIG. 1 is a perspective view of a beverage dispensing apparatus according to an example arrangement.

With reference to FIG. 1, an example beverage dispensing apparatus 200 is shown.

The beverage dispensing apparatus 200 comprises a water tank accessible via a lid 202 on the top of the beverage dispensing apparatus 200 and a container compartment having a door 204 for receiving a single-use, disposable beverage ingredient container (generally referred to as a filterpack, a freshpack or a pouch). The beverage dispensing apparatus 200 further comprises a bin 206 which sits below the container compartment and receives beverage ingredient containers after use. The bin 206 is received within a cavity formed in the beverage dispensing apparatus 200. A removable drip tray 208 is provided at the bottom of the beverage dispensing apparatus 200. The drip tray 208 comprises a grille which forms a support surface for supporting a cup or other vessel for receiving a beverage from the beverage dispensing apparatus 200 and a tray portion beneath the grille for catching any spillage which passes through the grille.

The beverage dispensing apparatus 200 further comprises a user interface in the form of a display screen 210 and a plurality of selection buttons 212 for allowing a user to control the function of the beverage dispensing apparatus 200. For example, the plurality of selection buttons 212 allow a user to select beverage making parameters, as will be described further below.

Figure 2:
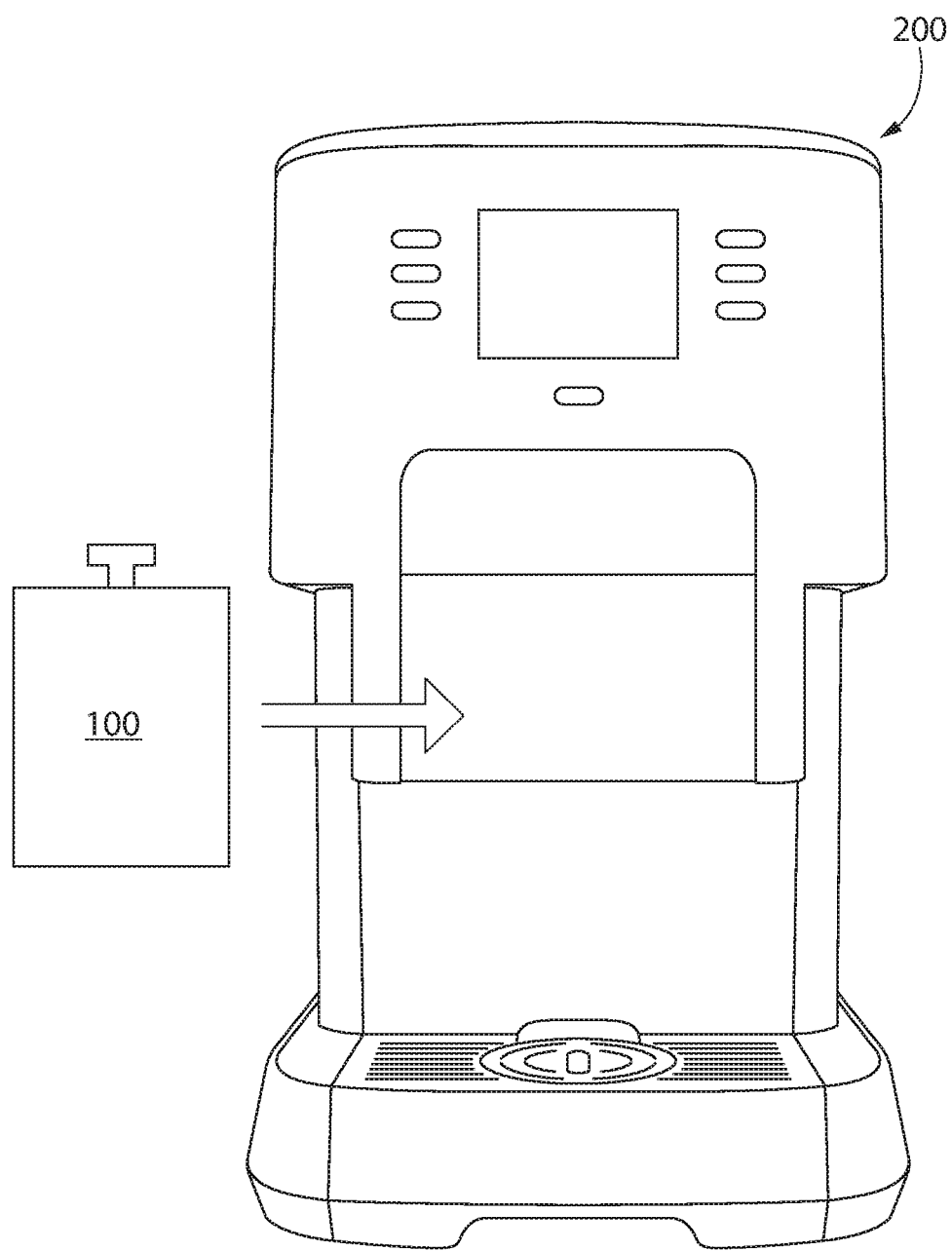
FIG. 2 is a front view of the beverage dispensing apparatus of FIG. 1 and a beverage ingredient container according to an example arrangement.

FIG. 2 shows the assembled beverage dispensing apparatus with an exemplary beverage ingredient container 100 as will be described in detail below with reference to FIGS. 3 and 4.

Figure 3:
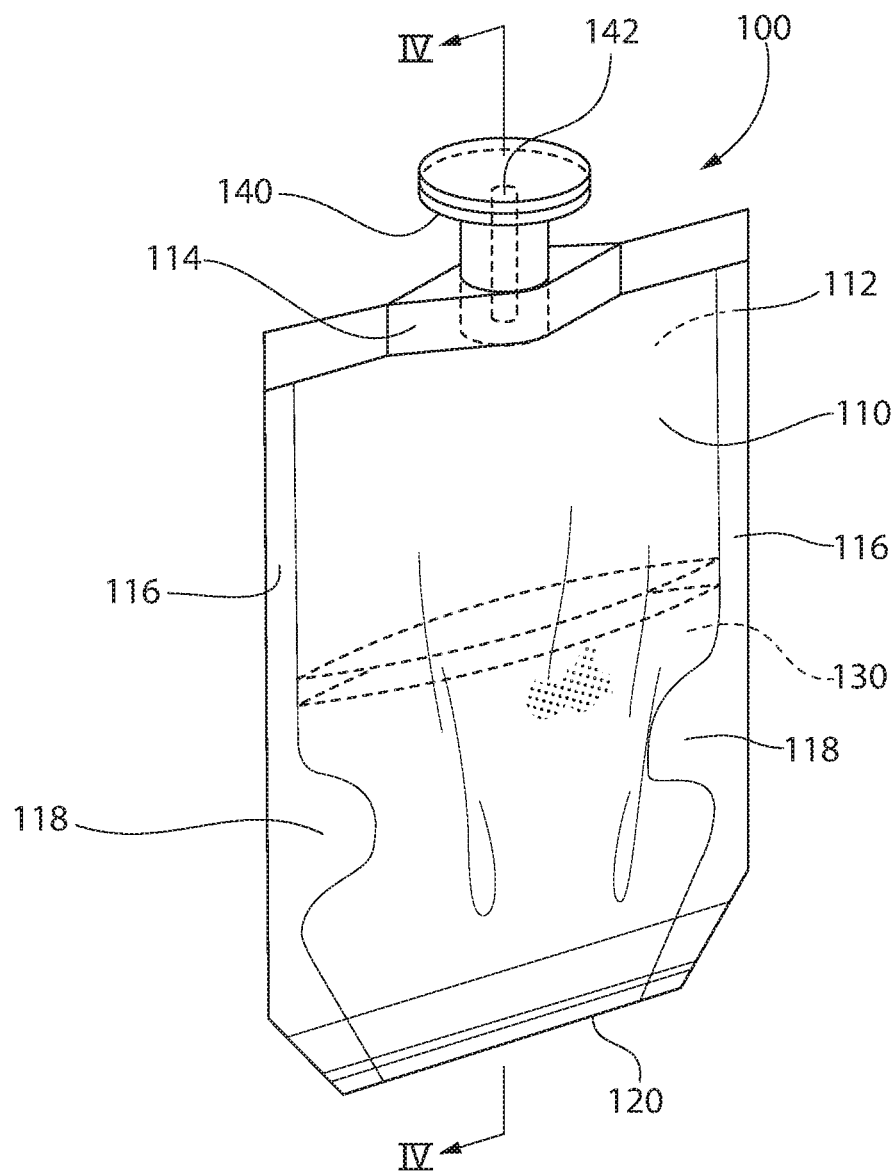
FIGS. 3 and 4 illustrate the beverage ingredient container of FIG. 2 according to an example arrangement.
Figures 4A, 4B:
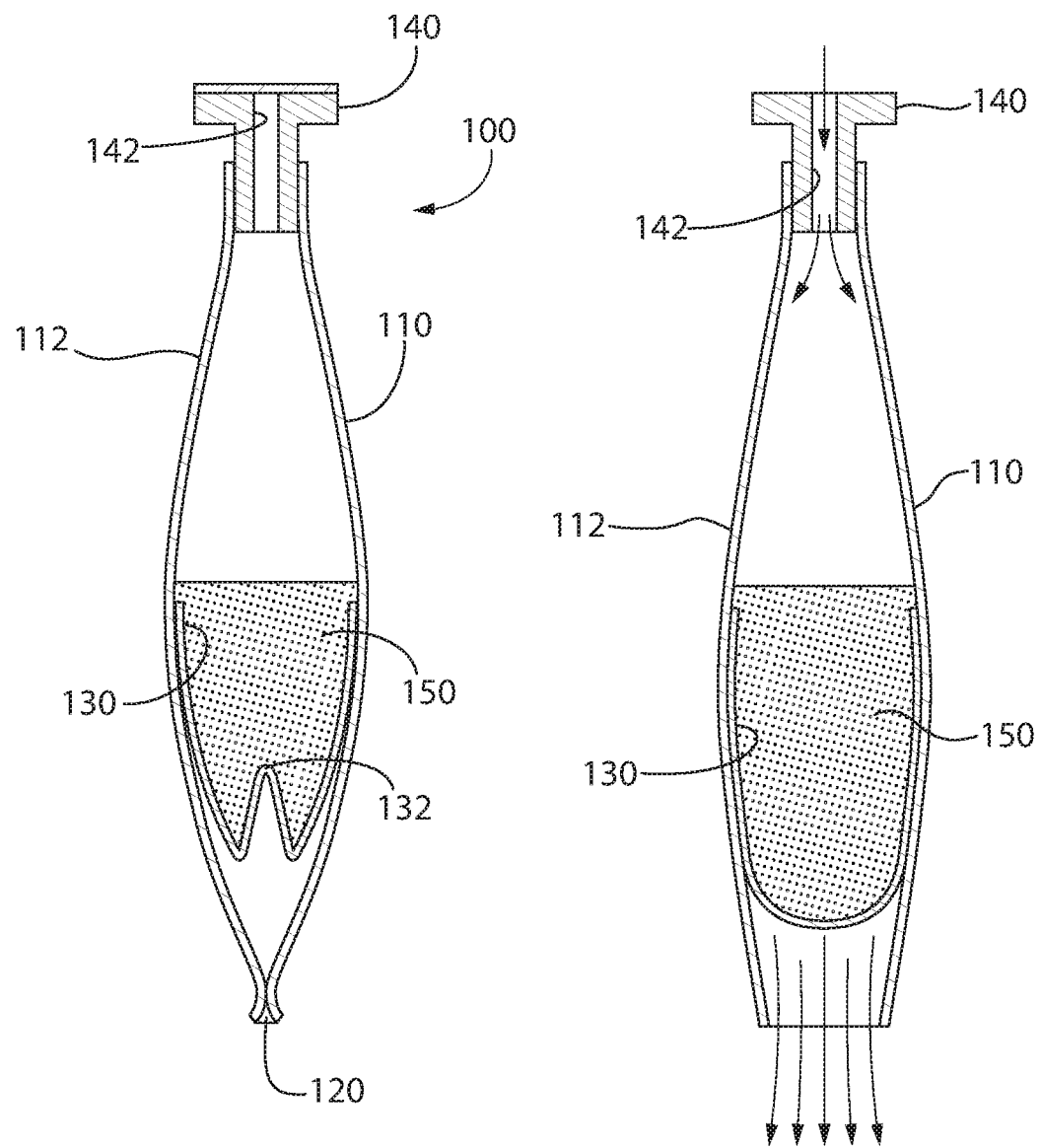

As shown in FIGS. 3 and 4, the exemplary beverage ingredient container 100 comprises front and back sheets 110, 112 of a liquid- and air-impermeable sheet material which are permanently bonded together around their top and side edges 114, 116 to form a sachet as described in more detail below. The front and back sheets 110, 112 are also bonded together along a bottom edge 120 of the container, but this bond is releasable under the effect of heat or pressure inside the container. For example, the bonding of the bottom edge 120 may be by means of a pressure-sensitive adhesive. Within the container 100 is a folded web of filter material 130 bonded to the inside walls of the front and back sheets. The web of filter material 130 supports a beverage preparation ingredient 150, such as ground coffee or leaf tea. The container 100 further comprises a nozzle 140 having tubular bore 142. The nozzle 140 is inserted into the top edge of the sachet and bonded in airtight fashion to the front and back sheets, the nozzle being flanged to assist in locating the container 100 correctly within the beverage dispensing apparatus 200. The nozzle bore 142 is initially sealed by a suitable airtight freshness barrier.

As shown in FIG. 4, upon introduction of hot water through the injector tube and the nozzle bore 142, the beverage preparation ingredient 150 contained in the container 100 is mixed with the hot water and a beverage is brewed. The bottom seam 120 of the container 100 opens under the effect of heat and liquid pressure inside the container to define a beverage dispensing point, and the beverage passes through the filter web 130 and the open bottom of the container and is collected in a cup or other vessel located therebelow.

Figure 5:
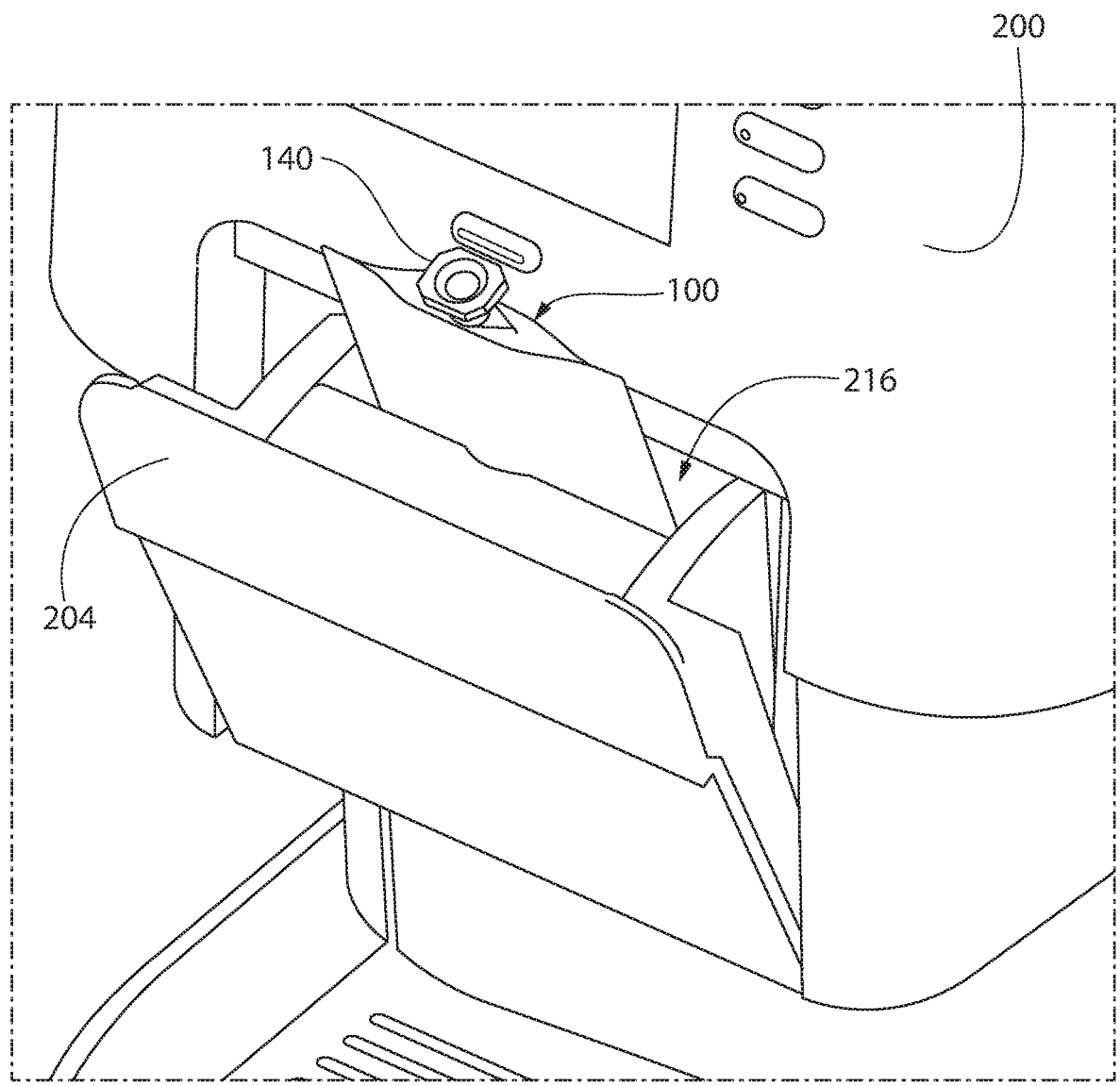
FIGS. 5 and 6 illustrate the insertion of the beverage ingredient container of FIGS. 2 to 4 in the beverage dispensing apparatus.
Figure 6:
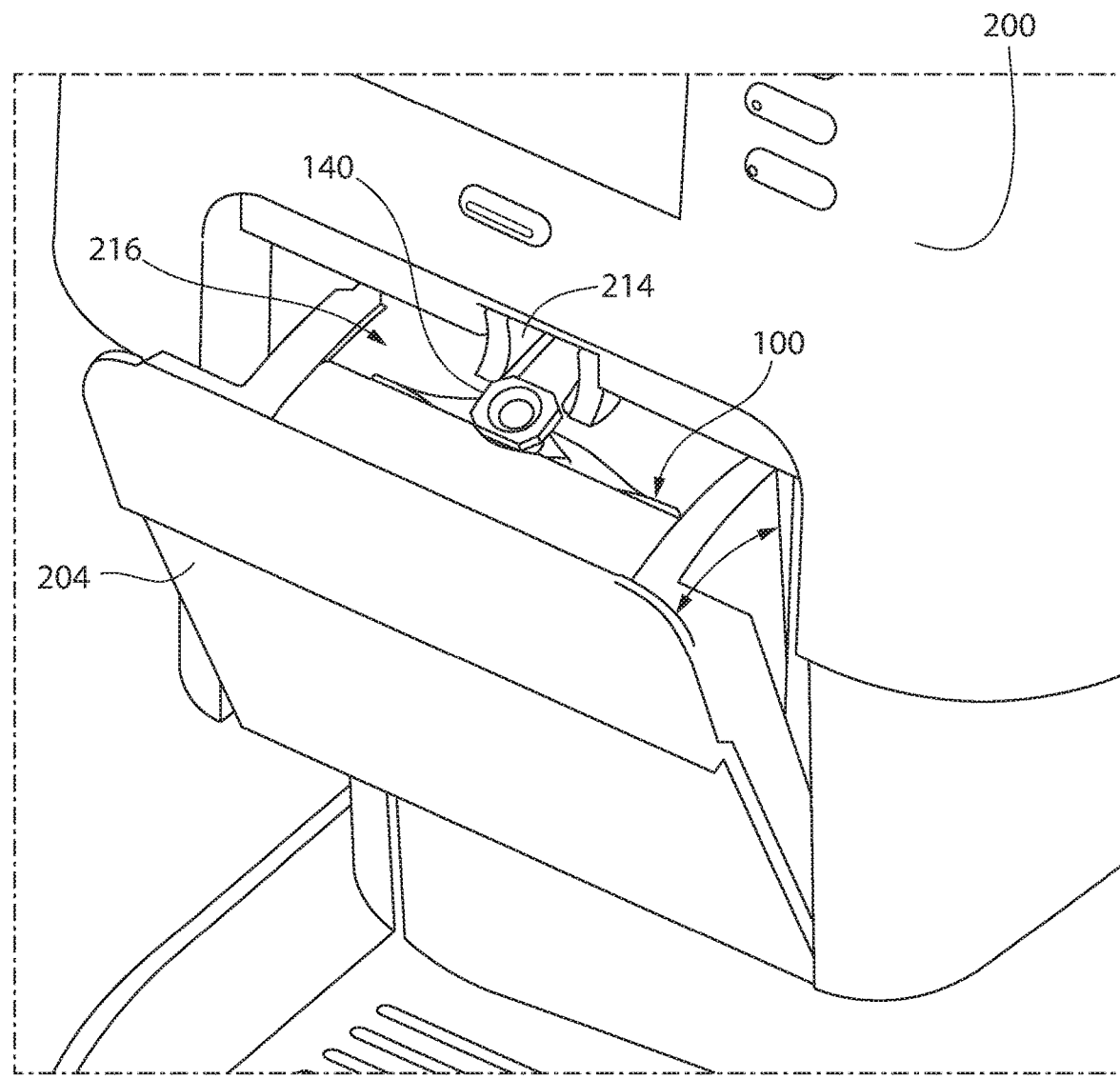

In use, the container 100 is introduced into the container compartment of the beverage dispensing apparatus 200 via a holder 216 in the door 204, as shown in FIGS. 5 and 6. The door 204 is pivotable between an open position and a closed position.

As shown in FIG. 6, an upper surface of the container compartment comprises a nozzle guide track 214 which receives the nozzle 140 of the container 100. The nozzle 140 slides along the guide track 214 as the door 204 is closed and the guide track 214 thereby guides the nozzle 140 into alignment with an injector tube (not shown). The injector tube is inserted into the nozzle bore 142, thereby piercing the freshness barrier. The water tank of the beverage dispensing apparatus 200 is connected to the injector tube by a fluid supply line provided with a pump and a water heater. Water from the water tank is thereby pumped and heated before being expelled from the injector tube into the container 100.

As shown in FIG. 4, upon introduction of the hot water through the injector tube and the nozzle bore 142, the beverage preparation ingredient 150 contained in the container 100 is mixed with the hot water and a beverage is brewed. The bottom seam 120 of the container 100 opens under the effect of heat and liquid pressure inside the container, and the beverage passes through the filter web 130 and the open bottom of the container and is collected in a cup or other vessel located therebelow.

Figure 7:
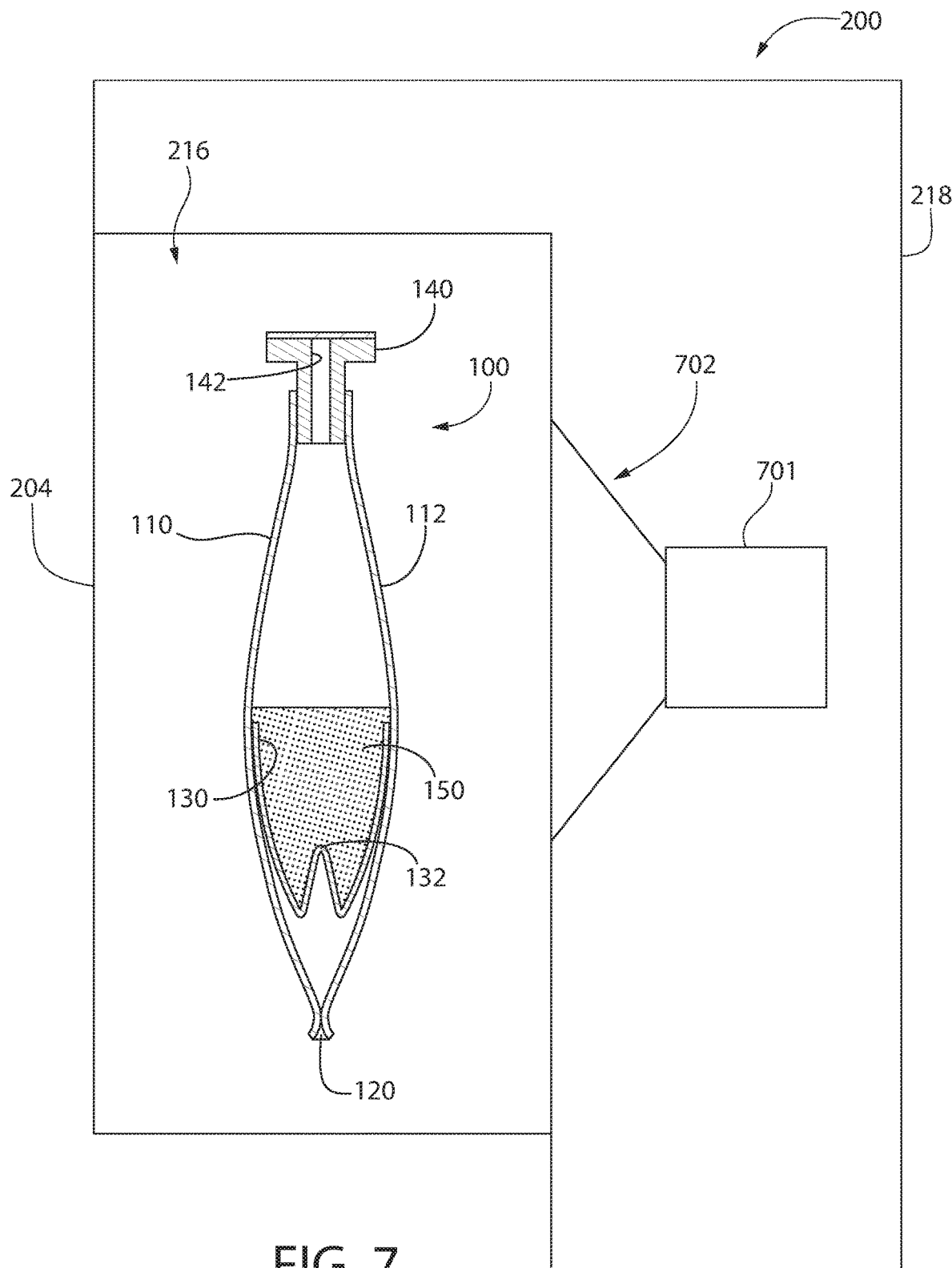
FIGS. 7 and 8 illustrate different orientations that the beverage ingredient container may take, relative to a scanner of the beverage dispensing apparatus, when received in a holder of the beverage dispensing apparatus.
Figure 8:
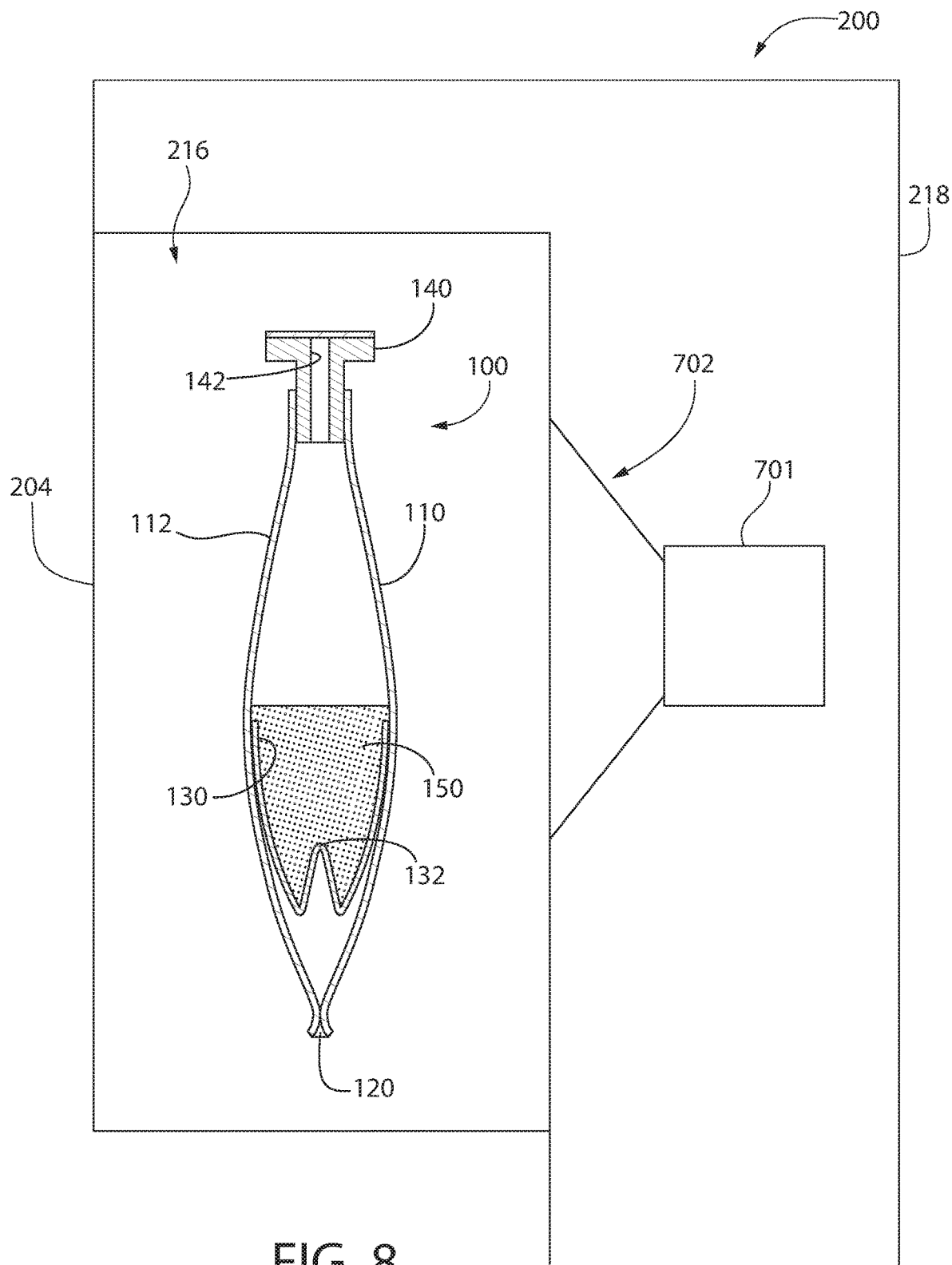

As best shown in FIGS. 7 and 8, the container 100 is held in the holder 216 of the door 204 in either a first orientation as shown in FIG. 7 in which a first, back sheet surface 112 of the container 100 faces the main body 218 of the beverage dispensing apparatus 200 or a second orientation as shown in FIG. 8 in which a second, front sheet surface 110 of the container 100 faces the body 218. In particular, the container 100 is held in the holder 216 of the beverage dispensing apparatus 200 such that the back surface 112 faces an optical scanner 701 housed within the body 218 of the apparatus 200 when the container 100 is received in the first orientation, and such that the front surface 110 faces the optical scanner 701 when the container 100 is received in the second orientation. Some or all of the container 100 falls within the field of view 702 of the scanner 701 when the door 204 is in the closed position. Further, the scanner 701 may work in the infra-red spectrum.

Figure 9:
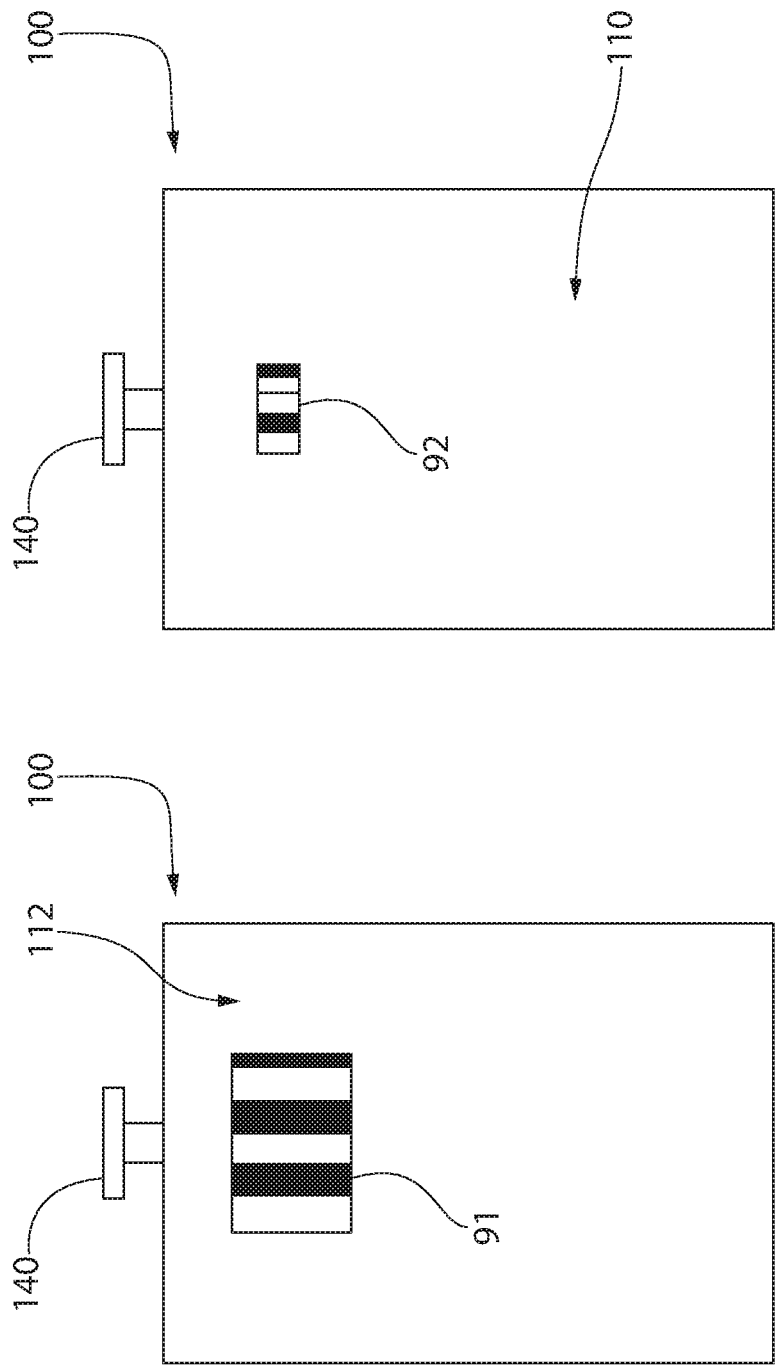
FIG. 9 schematically illustrates the beverage-ingredient container according to an example arrangement.

As schematically illustrated in FIG. 9, the container 100 comprises a first optical code 91 on the back surface 112 of the container 100, wherein the first optical code 91 is positioned on the back surface 112 at a position that falls within the field of view 702 of the optical scanner 701 of the beverage dispensing apparatus 200 when the container 100 is in the first orientation. The container 100 also comprises a second optical code 92 on the front surface 110 of the container 100 at a position that falls within the field of view 702 of the optical scanner 701 when the container 100 is in the second orientation.

The optical scanner is configured to capture an image of (i.e. image data representing) the optical code (e.g. barcode sequence, e.g. of parallel lines) being scanned which may then be processed to extract the information encoded within the optical code. For example, the image will be converted into a plurality of digital values which can then be decoded to extract the information (e.g. container identifier) encoded within the optical code. The image is processed by a processor within the beverage dispensing apparatus itself. This is in contrast to hypothetical arrangements in which the image may be sent to a remote computer, e.g. via a network such as the Internet or using one or more cloud servers, for processing remotely from the beverage dispensing apparatus.

The exact method by which the image data is converted into a plurality of digital values and decoded will depend on the way by which the information has been encoded in the optical code. In the examples illustrated in the Figures, the first optical code 91 and the second optical code 92 are each in the form of a barcode, which is an optical, machine-readable representation of data. Any suitable barcode technology known in the art may be used. However, in the example of FIG. 9, the barcodes encode (in other words store) information therein by systematically varying the widths and spacings of parallel lines, and may be referred to as one-dimensional (1D) barcodes. Of course, other types of barcodes, such as two-dimensional barcodes which do not necessarily use parallel bars as such, may be used instead. Correspondingly, the optical scanner is in the form of a barcode reader and may be configured to operate according to any known barcode reader technology. For example, the barcode reader may operate according to any one or more of a Pen-type scanner, a Laser scanner, a CCD reader and an omnidirectional barcode scanner, as is known in the art.

The first optical code 91 and the second optical code 92 each stores container-related information which includes information that is indicative of the container 100 itself (or rather the beverage type or beverage-ingredient contained therein). In the example of FIG. 9, the first optical code 91 and the second optical code 92 each stores at least a container identifier. The container identifier in this case is a stock keeping unit (SKU), which is a unique identifier, e.g. a distinct number or code, which identifies the type of beverage that is to be prepared using the container to which it relates. The container identifier may be used by the beverage dispensing apparatus 200 to control an aspect of beverage preparation. For example, the SKU may indicate to the beverage dispensing apparatus 200 that the container 100 is to be used to prepare a specific coffee (or alternatively a tea, for example, or a cold drink), and the beverage dispensing apparatus will use this information to determine appropriate beverage making parameters (e.g. water volume, water dwell time, etc.) to be used to prepare the beverage from the container 100.

It will be appreciated that using an SKU as the container identifier may also be advantageous in that it can be used to manage the inventory of the manufacturer of such containers. For example, when a business takes inventory of its stock, it will be able to count the quantity it has of each SKU.

In some case, it may be desirable to determine beverage making parameters based on further container-related information in addition to the container identifier. Such additional information may be referred to herein as supplemental container-related information and may be used by the beverage dispensing apparatus together with the container identifier to control beverage preparation. The supplemental container-related information includes one or more of: an identifier of a drink-type associated with the container identifier, an indication of a weight of beverage ingredient stored within the container, an indication of a geometry of the container and an identifier of a liquid injection tube with which the container is compatible.

In cases where supplemental information is to be used together with the container identifier to control beverage preparation, the optical codes included on the container may store all of the supplemental container-related information that is desired to allow the beverage dispensing apparatus to determine a set of one or more beverage making parameters for the container. However, it will be appreciated that the greater the amount of information that is stored by the optical code, the greater surface area that the optical code must take in order to effectively encode that information. This takes up valuable space on the surface of the container 100 that may otherwise be used for other purposes, such as to provide marketing material to the consumer. Therefore, in some cases it is desirable for one of the optical codes to be smaller than the other, so as to free space on the surface. Accordingly, in the arrangement of FIG. 9, the first optical code 91 has a larger surface area on the back surface 112 than the second optical code 92 on the front surface 110 and the first optical code 91 accordingly stores more container-related information than the second optical code 92. The first optical code 91 is encoded according to the "UPC-A" barcode standard, i.e. it is in the form of a 12 digit universal product code, whereas the second optical code 92 is encoded according to the "Code-2of5", i.e. interleaved 2 of 5 (ITF), continuous two-width barcode standard.

The first optical code 91 stores all of the supplemental container-related information that is required by the beverage dispensing apparatus to determine a corresponding set of one or more beverage making parameters for the container 100. However, the second optical code 92 on the front surface 110 stores only the container identifier. In this way, the container 100 is configured such that, regardless of which orientation that the container 100 takes when received by the holder 216, the beverage dispensing apparatus 200 will be able to determine at least the container identifier, while minimising the amount of surface area on the front surface 110 of the container 100 that is occupied by the second optical code 92.

The beverage dispensing apparatus 200 is configured to determine the supplemental information from the optical code being read only to an extent that the supplemental information is stored in that optical code. For example, the beverage dispensing apparatus 200 is configured such that, if the optical code being read does not contain supplemental container-related information, or contains some but not all of the supplemental container-related information that is required to determine the set of beverage making parameters for the container, it will obtain at least some of the supplemental container-related information from other sources, as required.

In particular, the beverage dispensing apparatus 200 is configured such that it firstly determines whether the container-related information that has been read by the optical scanner 701 includes supplemental container-related information. If, based on the information stored in the optical code, it is determined that the container-related information that has been read by the optical scanner 701 does not include supplemental container-related information, the beverage dispensing apparatus 200 obtains the supplemental container-related information from a different source, such as an internal or external, e.g. online, database, based on the container identifier. For example, a database may comprise a plurality of entries for respective container identifiers, and each entry may include a full set of beverage making parameters for the container identifier, to be retrieved by the beverage dispensing apparatus 200 as appropriate.

If it is determined that the container-related information that has been read by the optical scanner 701 does include the supplemental container-related information, the beverage dispensing apparatus 200 obtains the supplemental container-related information from the container-related information that has been read by the optical scanner 701. In some case, the beverage dispensing apparatus 200 may be configured to determine whether the optical code stores all of the required supplemental container related information, and if it does not, determine which supplemental container-related information is missing. The beverage dispensing apparatus 200 will then obtain the missing information from the other sources as described above.

The overall operation of the beverage dispensing apparatus 200 when preparing a beverage from a beverage-ingredient container of the type described above with respect to FIG. 9 will now be described with respect to FIG. 10. In this arrangement, the beverage dispensing apparatus 200 is configured to control beverage preparation by preparing the beverage from the container 100 according to a set of beverage making parameters that is determined based on the container identifier and supplemental container-related information.

Figure 10:
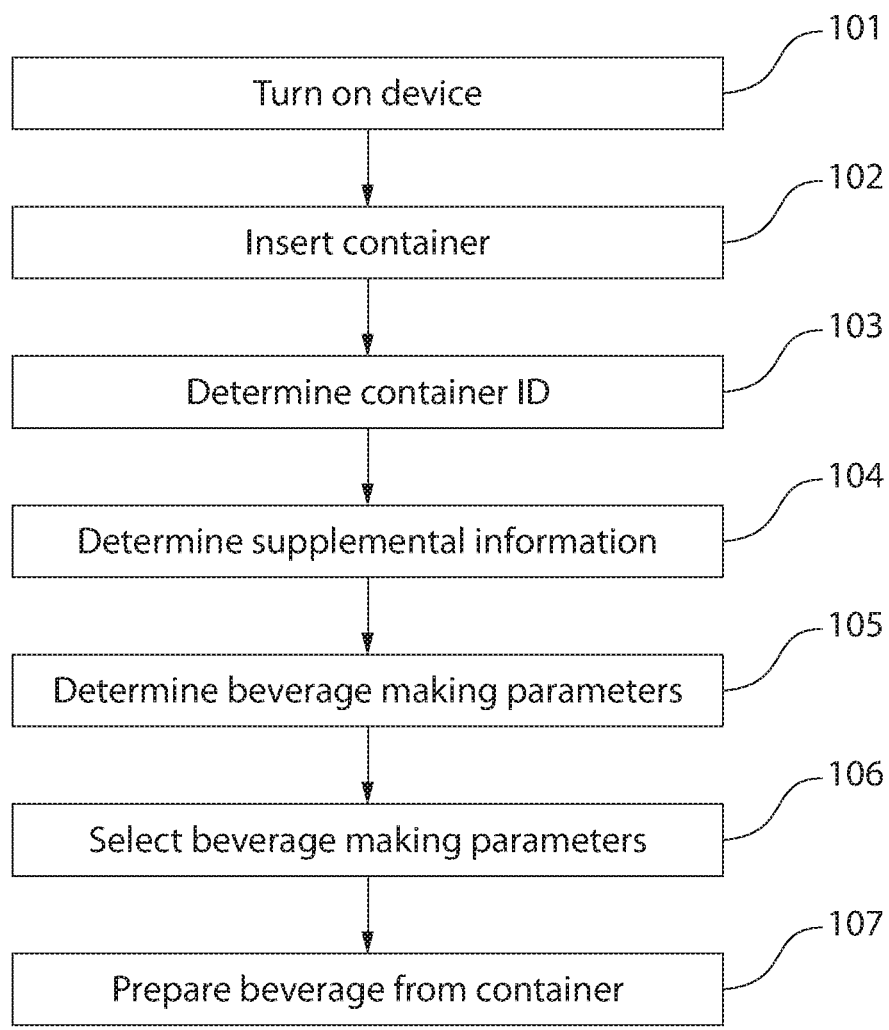
FIG. 10 is a flow chart schematically illustrating operation of the beverage dispensing apparatus.

As shown in FIG. 10, the method begins at step 101, when a user of the beverage dispensing apparatus presses a button to turn on the apparatus. After this, the user places a container inside the holder of the apparatus at step 102. The container is inserted into the holder in either one of a first orientation in which the first optical code faces an optical scanner of the beverage dispensing apparatus and a second orientation in which the second optical code faces the optical scanner.

The beverage dispensing apparatus will, at step 103, read the container-related information stored in either the first optical code or the second optical code, depending on whether the container is received by the holder in the first orientation or the second orientation, respectively. After reading the container-related information at step 103, the beverage dispensing apparatus will determine the container identifier from the optical code that has been read by decoding the optical code in question.

The beverage dispensing apparatus also determines supplemental container-related information at step 104. As described above, the way that this is done depends on the container-related information that is stored in the optical code that is being read by the scanner. In particular, where the optical code stores the container identifier only, the beverage dispensing apparatus obtains supplemental container-related information from a different source. However, where all of the supplemental container-related information is stored in the optical code, the beverage dispensing apparatus will obtain and determine the supplemental container-related information from the optical code in question. In other arrangements, the beverage dispensing apparatus is configured to determine supplemental information from both the optical code that is being read and also one or more other sources.

Figure 11:
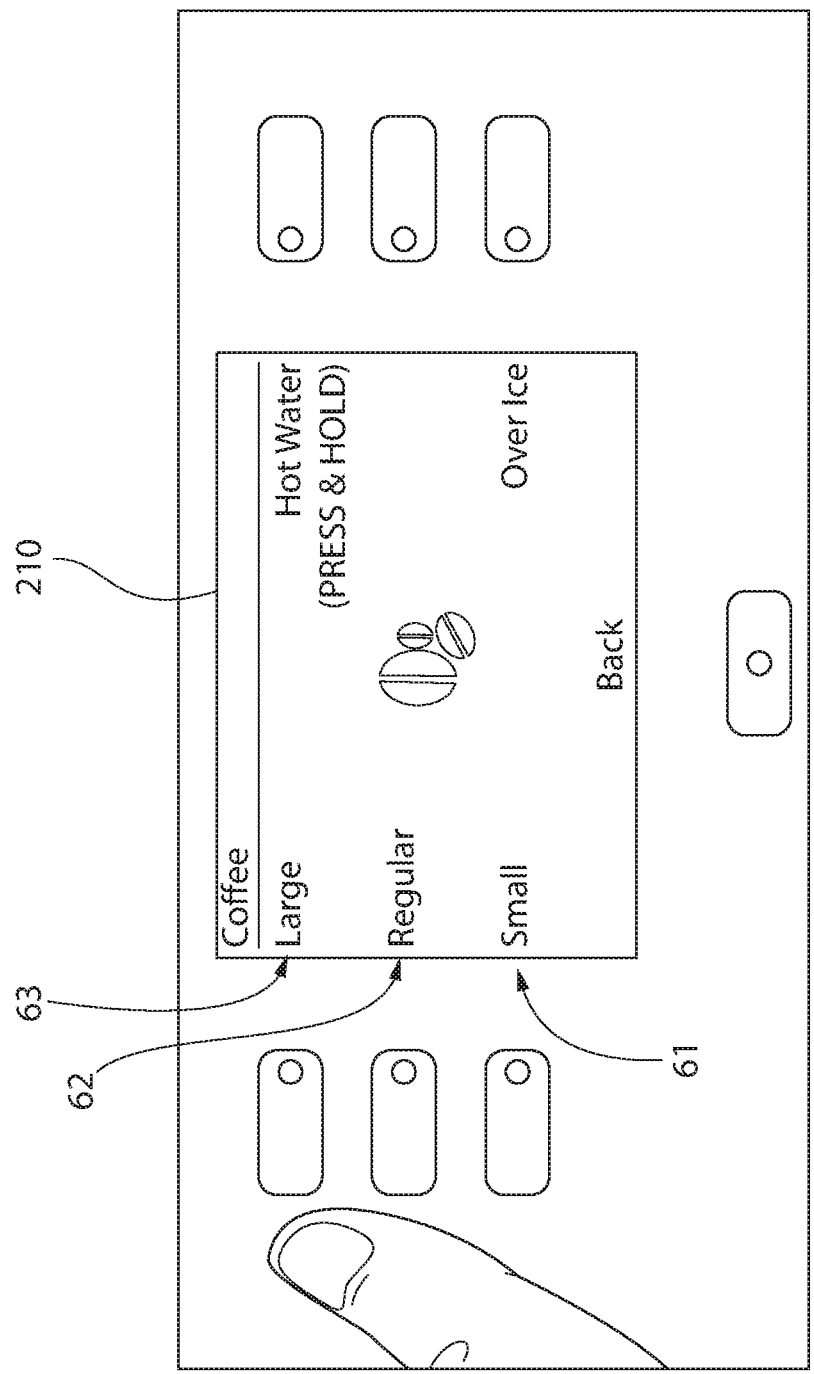
FIG. 11 schematically illustrates a user-interface of the beverage dispensing apparatus during operation of the beverage dispensing apparatus according to the flow chart of FIG. 10.

At step 105, the beverage dispensing apparatus determines a set of one or more beverage making parameters based on both the container identifier and the determined supplemental container-related information. As shown in FIG. 11, the set of beverage making parameters may comprise a set of alternative parameter options defined for the container-related information, in this case alternative water volume options. These options may be provided to the user on the electronic display 210 as icons corresponding to either a "small" 61, "medium" 62 or "large" 63 volume of water to be used for the preparation of a coffee from the specific container in question. It will be appreciated here that the alternative water volume options corresponding to the icons displayed to the user may be specific and tailored to the beverage type relating to the container, rather than generic volume options that may otherwise be provided to the user regardless of which beverage is to be prepared.

The user then selects, at step 106, one of the alternative beverage making parameters displayed on the electronic display 210, e.g. the "large" icon 63, and the beverage dispensing apparatus will accordingly prepare the beverage from the container using the selected beverage making parameter at step 107.

While operation of the beverage dispensing apparatus has been described above with respect to FIGS. 10 and 11 as including a user selection stage, this is not required. The beverage dispensing apparatus may instead determine only beverage making parameters that are to be used to prepare the beverage from the container without further input from the user.

As described, the technology described herein enables the beverage dispensing apparatus 200 to be provided with only a single optical scanner 701. Although this has been described as being housed within the body 218 of the apparatus 200, it will be appreciated that it may instead be located in the door 204 or in any other element of the apparatus 200.

Furthermore, it will be appreciated that although the technology described herein uses barcodes as the optical codes, this is not required. It is equally possible, and in some cases desirable, to use other coding methods such as Radiofrequency identification, colour or shape recognition technology. For example, each container type may be associated with a different colour (which in this case is the container identifier) and the scanner may be configured to detect the container type (container identifier) based on the detected colour.

It will be understood that the technology described herein is not limited to the arrangements above described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A beverage-ingredient container to be used in the preparation of a beverage by a beverage dispensing apparatus;
   wherein the container is receivable in a holder of the beverage dispensing apparatus in either a first orientation in which a back surface of the container faces an optical scanner of the beverage dispensing apparatus and a front surface of the container that is opposite the back surface of the container faces away from the optical scanner or a second orientation in which the front surface of the container faces the optical scanner and the back surface of the container faces away from the optical scanner;
   the container comprising:
      a first optical code on the back surface of the container, wherein the first optical code is positioned on the back surface to be read by the optical scanner of the beverage dispensing apparatus when the container is in the first orientation; and
      a second optical code on the front surface of the container, wherein the second optical code is positioned on the front surface to be read by the optical scanner of the beverage dispensing apparatus when the container is in the second orientation;
   wherein the first optical code and the second optical code each stores container-related information including a container identifier which, when read by the optical scanner of the beverage dispensing apparatus, can be used by the beverage dispensing apparatus to control beverage preparation.

2. The container according to claim 1, wherein at least one of the first optical code and the second optical code stores supplemental container-related information in addition to the container identifier.

3. The container according to claim 1, wherein the first optical code located on the back surface of the container is larger than the second optical code located on the front surface of the container.

4. The container according to claim 1, wherein a first surface area occupied by the first optical code on the back surface is larger than a second surface area occupied by the second optical code on the front surface.

5. The container according to claim 1, wherein the first optical code is in the form of a first barcode and the second optical code is in the form of a second barcode which is different to the first barcode.

6. The A container according to claim 1, wherein the first optical code is different than the second optical code.

7. An apparatus for preparing a beverage, the apparatus comprising:
the container according to claim 1; and
a beverage preparation device comprising:
a holder for receiving the container therein;
an optical scanner configured to read the container-related information stored in the first optical code if the container is received by the holder in the first orientation and to read the container-related information stored in the second optical code if the container is received by the holder in the second orientation; and
a controller configured to control beverage preparation based on the container identifier included in the container-related information that has been read by the optical scanner.

8. The apparatus according to claim 7, wherein the controller is configured to control beverage preparation by:
determining a set of one or more beverage making parameters for preparing the beverage, based at least in part on the container identifier.

9. The apparatus according to claim 8, wherein the controller is configured to control beverage preparation by:
determining the set of one or more beverage making parameters for preparing the beverage, based on the container identifier and supplemental container-related information.

10. The apparatus according to claim 9, wherein the controller is configured to obtain the supplemental container-related information by:
determining whether the container-related information that has been read by the optical scanner includes supplemental container-related information; and
if it is determined that the container-related information that has been read by the optical scanner does not include supplemental container-related information:
obtaining the supplemental container-related information from a different source, based on the container identifier; whereas
if it is determined that the container-related information that has been read by the optical scanner does include supplemental container-related information:
obtaining the supplemental container-related information from the container-related information that has been read by the optical scanner.

11. The apparatus according to claim 10, wherein obtaining the supplemental container-related information from a different source based on the container identifier comprises:
obtaining the supplemental container-related information from an entry in a database corresponding to the container identifier.

12. The apparatus according to claim 8, further comprising:
a user-interface comprising an electronic display, wherein the user interface is configured to receive an input by a user of the apparatus;
wherein the set of one or more beverage making parameters comprises alternative beverage making parameters defined for the container; and
wherein the controller is configured to:
display the alternative beverage making parameters defined for the container to the user on the electronic display; and
if the user-interface receives an input corresponding to a selection of one of the alternative beverage making parameters displayed on the electronic display, prepare the beverage from the container using the selected beverage making parameter.

13. A method of operating a beverage dispensing apparatus, the method comprising:
selecting a beverage-ingredient container which comprises a first optical code positioned on a back surface of the container and a second optical code positioned on a front surface of the container that is opposite the back surface of the container, wherein the first optical code and the second optical code each stores container-related information including a container identifier;
positioning the container in a holder of the beverage dispensing apparatus in either a first orientation in which the first optical code on the back surface of the container faces an optical scanner of the beverage dispensing apparatus while the front surface of the container faces away from the optical scanner or a second orientation in which the second optical code on the front surface of the container faces the optical scanner while the back surface of the container faces away from the optical scanner;
reading, by the optical scanner, the container-related information stored in either the first optical code or the second optical code, depending on whether the container is received by the holder in the first orientation or the second orientation, respectively; and
controlling, by a controller of the beverage dispensing apparatus, beverage preparation based on the container identifier included in the container-related information that has been read by the optical scanner.

14. The method according to claim 13, wherein controlling beverage preparation based on the container identifier comprises:
determining a set of one or more beverage making parameters for preparing the beverage based, at least in part, on the container identifier.

15. The method according to claim 14, wherein controlling beverage preparation based on the container identifier comprises:
determining a set of one or more beverage making parameters for preparing the beverage based on the container identifier and supplemental container-related information.

16. The method according to claim 15, further comprising obtaining the supplemental container-related information by:
determining whether the container-related information that has been read by the optical scanner includes supplemental container-related information; and
if it is determined that the container-related information that has been read by the optical scanner does not include supplemental container-related information:

obtaining the supplemental container-related information from a different source, based on the container identifier; whereas if it is determined that the container-related information that has been read by the optical scanner does include supplemental container-related information:

obtaining the supplemental container-related information from the container-related information that has been read by the optical scanner.

17. The method according to claim 16, wherein obtaining the supplemental container-related information from a different source based on the container identifier comprises:

obtaining the supplemental container-related information from an entry in a database that corresponds to the container identifier.

18. The method according to claim 14, wherein the set of one or more beverage making parameters comprises alternative beverage making parameters defined for the container; and the method further comprises:

displaying the alternative beverage making parameters defined for the container to a user of the beverage dispensing apparatus on an electronic display;

receiving a user-input corresponding to a selection of one of the alternative beverage making parameters displayed on the electronic display; and preparing the beverage from the container using the selected beverage making parameter.

19. The container according to claim 1 further comprising:

a top end comprising an inlet for receiving a liquid;

a bottom end comprising an outlet for dispensing the beverage;

a longitudinal axis extending between the top and bottom ends;

wherein the first optical code has a first length measured in a direction perpendicular to the longitudinal axis and the second optical code has a second length measured in the direction perpendicular to the longitudinal axis, the first length being greater than the second length.

20. The container according to claim 1 further comprising:

a front sheet comprising the front surface;

a back sheet comprising the rear surface, the front and back sheets being permanently bonded together along top and side edges thereof and releasably bonded together along bottom edges thereof to form a sachet comprising a cavity containing a beverage ingredient; and a nozzle coupled to the front and back sheets and defining the inlet.

* * * * *